No. 756,984. PATENTED APR. 12, 1904.
W. Z. SEARLE.
EYEGLASS ATTACHMENT FOR SUSPENDING SUPPLEMENTAL EYEGLASSES.
APPLICATION FILED AUG. 20, 1903.
NO MODEL.

Inventor
Will Z. Searle.

Witnesses

By
Attorneys

No. 756,984.

Patented April 12, 1904.

UNITED STATES PATENT OFFICE.

WILL Z. SEARLE, OF PETOSKEY, MICHIGAN.

EYEGLASS ATTACHMENT FOR SUSPENDING SUPPLEMENTAL EYEGLASSES.

SPECIFICATION forming part of Letters Patent No. 756,984, dated April 12, 1904.

Application filed August 20, 1903. Serial No. 170,219. (No model.)

*To all whom it may concern:*

Be it known that I, WILL Z. SEARLE, a citizen of the United States, residing at Petoskey, in the county of Emmet and State of Michigan, have invented certain new and useful Improvements in Eyeglass Attachments for Suspending Supplemental Eyeglasses, of which the following is a specification.

This invention provides a peculiar form of suspending means adapted to be attached to the ordinary form of eyeglasses used as supplemental eyeglasses in connection with the common nose-clamp eyeglass structure and spectacles also. It is known that many persons find it necessary to use two pairs of eyeglasses or spectacles for reading or short-distance purposes or for clear sight with reference to long-distance objects. It is my design, therefore, to provide removable hook devices to be attached to the nose-clamping type of eyeglasses, so that the latter may be suspended from any of the common types of glasses at present in use.

I am aware that it is not new to provide a special form of frame carrying the lens, whereby said frame may be used in connection with other glasses with the object above described in view. However, it is my purpose to provide suspending means in the form of simple and inexpensive hook devices which are adapted to be secured to the nose-guard type of glasses when the latter are to be used supplementary to other glasses or spectacles.

For a full description of the invention and the merits thereof and also to acquire a knowledge of the details of construction of the means for affecting the result reference is to be had to the following description and drawings hereto attached.

While the essential and characteristic features of the invention are susceptible of modification, still the preferred embodiment of the invention is illustrated in the accompanying drawings, in which—

Figure 1:
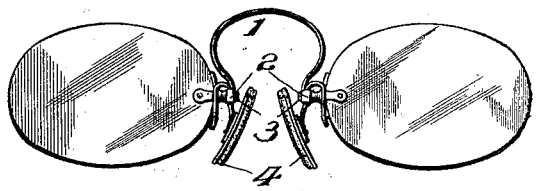
Figure 2:
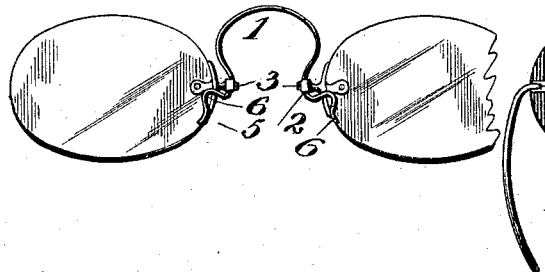
Figure 3:
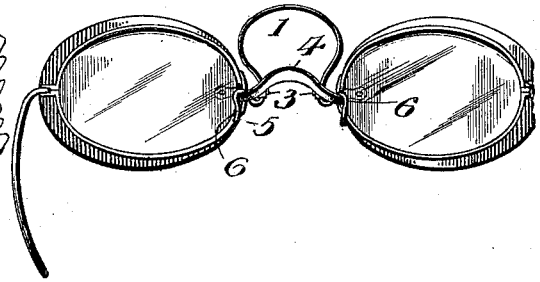
Figure 4:
Figure 5:
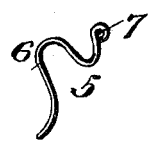

Figure 1 is a rear view showing one form of the hook devices applied to a pair of glasses. Fig. 2 is a view similar to Fig. 1, illustrating a slightly-different form of hook device by which the supplemental hooks are adapted for suspension from spectacles. Fig. 3 is a rear view showing the supplemental glasses suspended from a pair of spectacles. Fig. 4 is a detail view of one form of hook. Fig. 5 is a detail view of the other form of hook.

Corresponding and like parts are referred to in the following description and indicated in all the views of the drawings by the same reference characters.

In the common form of nose-clamping eyeglasses the spring 1 is secured between the spaced ears of a stud 2. The fastening 3—a small screw—secures the spring to the stud and at the same time secures the guards 4 thereto, passing through the suspended extensions of the said guards. The guards 4 are not utilized when the glasses are to be used as supplemental glasses, the hooks 5 being secured to the said glasses instead of the guards. The hooks 5 comprise the spring-engaging portion 6 and the attaching-eyes 7. The attaching-eyes are disposed between the spring 1 and the studs 2 and are secured in place by the fastening 3, which passes through the eyes, securing the hooks rigidly in position. The hooks 5 engage over the shanks of the studs 2 when the supplemental glasses are suspended from the other glasses used by the wearer. When the hooks are to suspend the supplemental glasses or spectacles, they are of slightly-different form from the hooks which are used when the supplemental glasses are suspended from the nose-clamping type of glasses, the first-mentioned form of hooks extending downwardly and upwardly from the attaching-eye and recurved to form the spring-attaching portions 6. The other form of hooks extend upwardly and recurve downwardly, as shown most clearly in Fig. 1 of the drawings.

The esential feature of the invention lies in the fact that the suspending-hooks 5 are readily adapted to be secured to the common form of nose-clamping glasses, it not being necessary to provide a special form of frame involving a greater cost and undesirable for other reasons, as contemplated by those inventions heretofore patented and having in view my object.

The attaching-hooks 5 may be manufactured in quantities and sold to dealers to be affixed to the supplemental glasses by the latter when there is a call for this peculiar form of device. The hooks are preferably made from spring-wire or the like and are exceedingly inexpensive, at the same time being universal of application.

Having thus described the invention, what is claimed as new is—

As an article of manufacture, an attachment for suspending supplemental eyeglasses, the same comprising a removable hook device consisting of a single length of spring-wire having an end portion bent into a loop to form an attaching-eye and having the body portion thereof recurved to provide a spring-engaging portion or shank.

In testimony whereof I affix my signature in presence of two witnesses.

WILL Z. SEARLE. [L. S.]

Witnesses:
   LEON CHICHESTER,
   W. F. HOPKINS.